(12) United States Patent
Chu et al.

(10) Patent No.: US 9,991,996 B2
(45) Date of Patent: Jun. 5, 2018

(54) SCHEDULING FOR ORTHOGONAL FREQUENCY DIVISION MULTIPLE ACCESS (OFDMA) TRANSMISSIONS IN A WIRELESS LOCAL AREA NETWORK (WLAN)

(71) Applicant: STMicroelectronics, Inc., Coppell, TX (US)

(72) Inventors: Liwen Chu, San Ramon, CA (US); George A. Vlantis, Sunnyvale, CA (US)

(73) Assignee: STMicroelectronics, Inc., Coppell, TX (US)

( * ) Notice: Subject to any disclaimer, the term of this patent is extended or adjusted under 35 U.S.C. 154(b) by 170 days.

(21) Appl. No.: 15/006,191

(22) Filed: Jan. 26, 2016

(65) Prior Publication Data

US 2016/0226635 A1 Aug. 4, 2016

Related U.S. Application Data

(60) Provisional application No. 62/111,177, filed on Feb. 3, 2015.

(51) Int. Cl.
*H04L 5/00* (2006.01)
*H04L 1/16* (2006.01)
(Continued)

(52) U.S. Cl.
CPC .............. *H04L 5/003* (2013.01); *H04L 1/16* (2013.01); *H04L 5/0037* (2013.01);
(Continued)

(58) Field of Classification Search
CPC ......... H04L 5/003; H04L 1/16; H04L 5/0037; H04L 5/0007; H04W 72/04;
(Continued)

(56) References Cited

U.S. PATENT DOCUMENTS

| 8,503,283 B2 | 8/2013 | Kafle et al. |
| 8,559,323 B2 | 10/2013 | Hart |

(Continued)

FOREIGN PATENT DOCUMENTS

| WO | WO-2015077223 A1 | 5/2015 |
| WO | WO-2015095144 A1 | 6/2015 |

(Continued)

OTHER PUBLICATIONS

EPO Search Report and Written Opinion for EP16153195.9 dated Jun. 3, 2016 (11 pages).

(Continued)

*Primary Examiner* — Peter Chau
(74) *Attorney, Agent, or Firm* — Crowe & Dunlevy

(57) ABSTRACT

An access point (AP) contends for a medium during a contention period in order to obtain exclusive control of the medium for a certain time period that may include one or more transmission opportunities. The AP and client stations (STAs) communicate during the time period using orthogonal frequency division multiple access (OFDMA) techniques with scheduled use (i.e., allocation) of sub-channels of the medium. The AP controls this scheduling for down-link and up-link communications by sending control signaling to inform the STAs of the resource allocation schedule which specifies STAs involved in the OFDMA communications along with the sub-channel identification bandwidth allocated to each STA. The control signaling may be a combination of physical layer (PHY) and medium access control layer (MAC) communicated information.

13 Claims, 6 Drawing Sheets

(51) Int. Cl.
*H04W 72/12* (2009.01)
*H04W 72/04* (2009.01)
*H04W 74/08* (2009.01)
*H04W 84/12* (2009.01)

(52) U.S. Cl.
CPC .......... *H04W 72/04* (2013.01); *H04W 72/121* (2013.01); *H04L 5/0007* (2013.01); *H04W 72/1289* (2013.01); *H04W 74/0816* (2013.01); *H04W 84/12* (2013.01)

(58) Field of Classification Search
CPC ........... H04W 72/121; H04W 74/0816; H04W 84/12; H04W 72/1289
See application file for complete search history.

(56) References Cited

U.S. PATENT DOCUMENTS

| | | | |
|---|---|---|---|
| 2011/0286402 A1 | 11/2011 | Gong | |
| 2012/0218983 A1* | 8/2012 | Noh | H04B 7/0452 370/338 |
| 2012/0314673 A1* | 12/2012 | Noh | H04W 72/042 370/329 |
| 2013/0229996 A1* | 9/2013 | Wang | H04W 72/0413 370/329 |
| 2013/0286959 A1* | 10/2013 | Lou | H04W 72/04 370/329 |
| 2015/0131517 A1* | 5/2015 | Chu | H04W 72/005 370/312 |
| 2016/0066338 A1* | 3/2016 | Kwon | H04L 5/0007 370/330 |
| 2016/0165574 A1* | 6/2016 | Chu | H04L 5/0007 370/312 |
| 2016/0165589 A1* | 6/2016 | Chu | H04L 5/0007 370/329 |
| 2017/0099119 A1* | 4/2017 | Rison | H04L 1/0061 |
| 2017/0170937 A1* | 6/2017 | Chun | H04L 5/0048 |
| 2017/0171878 A1* | 6/2017 | Chun | H04W 72/1268 |
| 2017/0223665 A1* | 8/2017 | Chun | H04W 72/005 370/329 |
| 2017/0230218 A1* | 8/2017 | Park | H04L 27/2608 |
| 2017/0238286 A1* | 8/2017 | Chun | H04W 72/042 |
| 2017/0318597 A1* | 11/2017 | Mori | H04W 72/1205 |

FOREIGN PATENT DOCUMENTS

| | | |
|---|---|---|
| WO | WO-2015095161 A1 | 6/2015 |
| WO | WO-2015169189 A1 | 11/2015 |
| WO | WO-2016076993 A1 | 5/2016 |

OTHER PUBLICATIONS

Fallah, et al, "Hybrid OFDMA/CSMA Based Medium Access Control for Next-Generation Wreless LANs," IEEE ICC '08, 2008, pp. 2762-2768.

* cited by examiner

VHT PLCP SIGA

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|
| BW | | OFDMA Indication | | STBC | Group ID | | | | | OFDMA[1] Sub-Channel Position | | | OFDMA[2] Sub-Channel Position | | | OFDMA[3] Sub-Channel Position | | | OFDMA[4] Sub-Channel Position | | | TXOP_PS_NOY_ALLOWED | Reserved |

VHT PLCP SIGB

| 0 | 1 | 2 | 3 | 4 | 5 | 6 | 7 | 8 | 9 | 10 | 17 | 18 | 23 |
|---|---|---|---|---|---|---|---|---|---|---|---|---|---|
| Short GI | Short GI NSYM Disambig-uation | SU/MU[0] Coding | LDPC Extra OFDM Symbols | MU[1] Coding | MU[2] Coding | MU[3] Coding | OFDMA Sub-Channel Bandwidth | | Reserved | CRC | | Tail | |

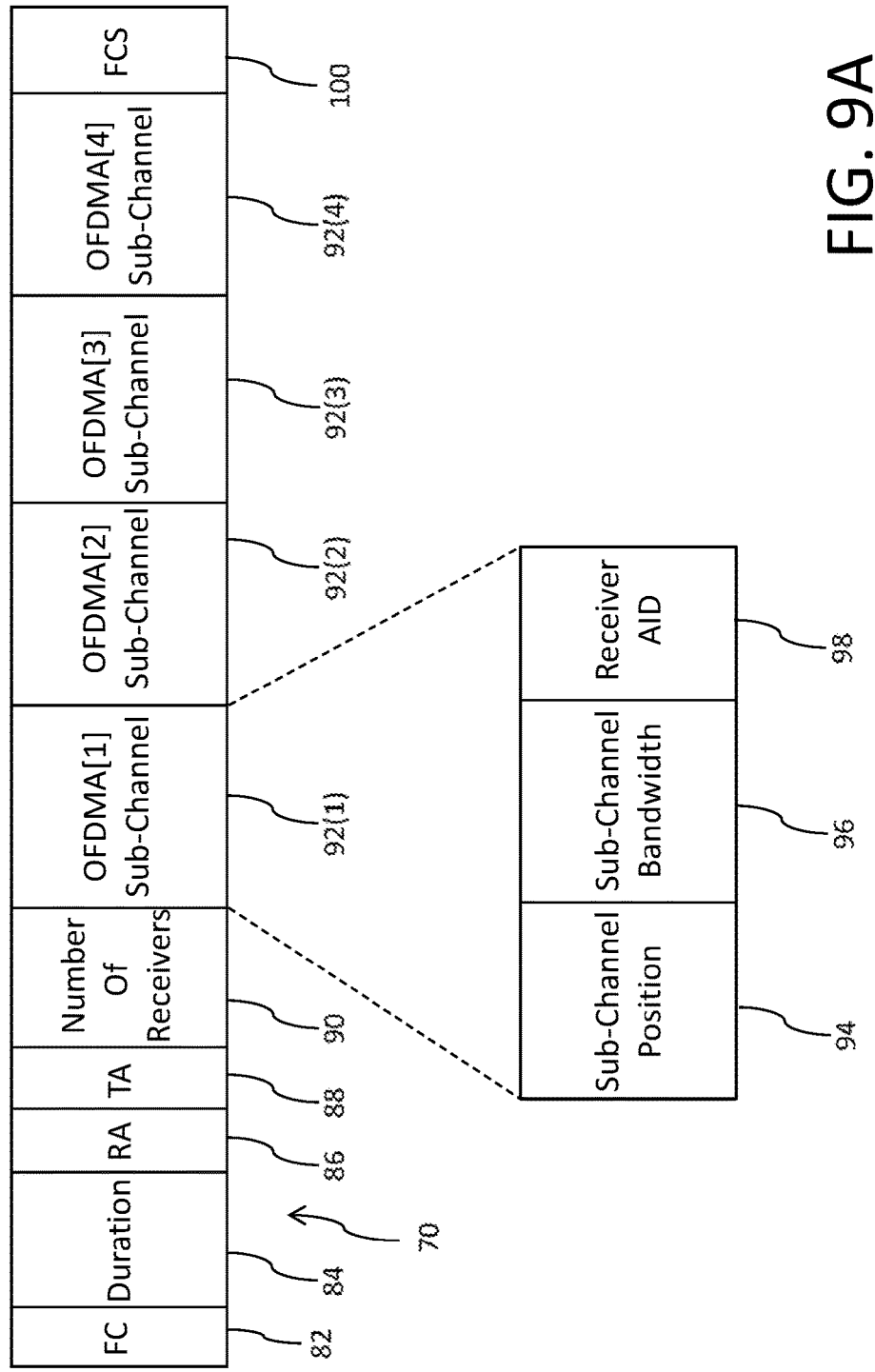

SCHEDULING FOR ORTHOGONAL FREQUENCY DIVISION MULTIPLE ACCESS (OFDMA) TRANSMISSIONS IN A WIRELESS LOCAL AREA NETWORK (WLAN)

PRIORITY CLAIM

This application claims priority to U.S. Provisional Application for Patent No. 62/111,177 filed Feb. 3, 2015, the disclosure of which is incorporated by reference.

TECHNICAL FIELD

The present invention relates generally to network communications and, in particular, to a method and apparatus for a communication in a wireless local area network (WLAN) using orthogonal frequency division multiple access (OFDMA) techniques.

BACKGROUND

Those skilled in the art understand that a wireless local area network (WLAN) may commonly use orthogonal frequency division multiplexing (OFDM) for communications between an access point (AP) and one or more client stations (STAs). OFDM is a transmission format where all transmission resources are allocated to a single STA at a time. The AP or STA wins access to the medium using a contention access technique (such as carrier sense multiple access with collision avoidance (CSMA/CA), and then transmits its data for up to a pre-defined time period. The medium is then relinquished for the AP or other stations to compete for access and use.

There is considerable interest in the art for the use of orthogonal frequency division multiple access (OFDMA) techniques in the WLAN. One reason for this interest is that OFDMA presents a transmission and access mechanism that would accommodate simultaneous transmissions with respect to multiple STAs. OFDMA is not a new technology as it has been used in many other communications schemes. Extension of OFDMA to WLAN, however, is a challenge because WLAN is a well-established and regulated technology (see, for example, the standardized implementations in IEEE 802.11). Frame structure and scheduling of resources must be fit within existing WLAN signaling and restrictions.

There is accordingly a need in the art for a messaging structure to control sub-channel allocation on both the down-link (DL—i.e., from the AP to one or more STAs) and the up-link (UL—i.e, from one or more STAs to the AP).

SUMMARY

In an embodiment, a method for orthogonal frequency division multiple access (OFDMA) communication in a wireless local area network (WLAN) including an access point (AP) and a plurality of client stations (STAs) comprises: obtaining by the AP of exclusive control of a wireless communications medium including a plurality of sub-channels for a time period; determining by the AP of an allocation of one or more sub-channels to certain ones of the STAs for use in said time period for OFDMA communications; and sending by the AP at a beginning of the time period on each of the plurality of sub-channels of a control frame including for each of said certain ones of the STAs: a) an identification of the STA; b) an identification of one or more sub-channels allocated to that STA; and c) an identification of a bandwidth to use for communications with that STA.

In an embodiment, a method for orthogonal frequency division multiple access (OFDMA) communication in a wireless local area network (WLAN) including an access point (AP) and a plurality of client stations (STAs) comprises: obtaining by the AP of exclusive control of a wireless communications medium including a plurality of sub-channels for a time period; determining by the AP of an allocation of one or more sub-channels to certain ones of the STAs for use in said time period for OFDMA communications; and sending by the AP of simultaneous Aggregated MAC Protocol Data Unit (A-MPDU) communications using OFDMA to the certain ones of the STAs, said simultaneous A-MPDU communications having a same start time and same finish time within said time period.

BRIEF DESCRIPTION OF THE DRAWINGS

For a more complete understanding of the present invention, and the advantages thereof, reference is now made to the following descriptions taken in conjunction with the accompanying drawings, in which:

FIGS. 5A and 5B illustrate specific example of the PHY component for OFDMA scheduling;

FIGS. 9A and 9B illustrate specific examples of the MAC component for OFDMA scheduling.

DETAILED DESCRIPTION OF THE DRAWINGS

The making and using of embodiments are discussed in detail below. It should be appreciated, however, that the present disclosure provides many applicable inventive concepts that may be embodied in a wide variety of specific contexts. The specific embodiments discussed are merely illustrative of specific ways to make and use the invention, and do not limit the scope of the invention.

Figure 1:
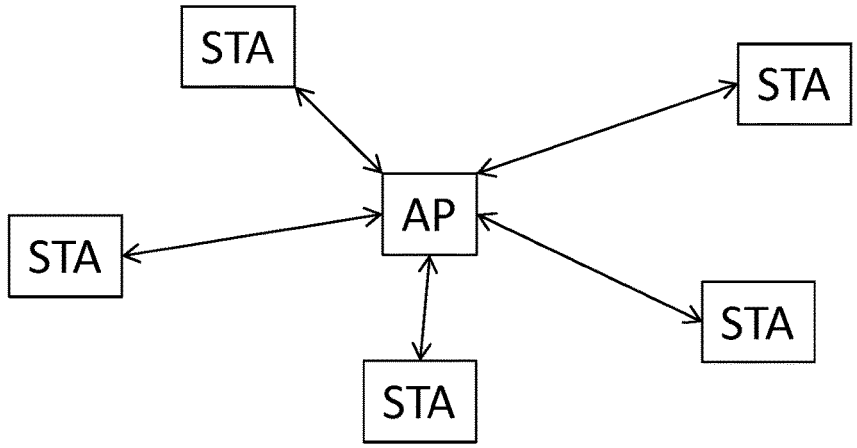
FIG. 1 illustrates a wireless local area network (WLAN) basic service set (BSS)

Reference is now made to FIG. 1 which illustrates a wireless local area network (WLAN) basic service set (BSS) comprising an access point (AP) and a plurality of client stations (STAs). The AP is a communication device allowing the STAs to access and communicate using WLAN. Examples of STAs include, without limitation, smartphones, computers, laptops, e-readers, watches, sensors, or other wireless devices.

The AP and STAs communicate with each other over a plurality of sub-channels, wherein each sub-channel is formed by a set of sub-carriers. The total number of supported sub-carriers may, for example, be 64, 256 or 512 depending on the implementation, and each set of sub-carriers forming a sub-channel is a certain fraction of the total number of sub-carriers. In operation, each sub-channel is assigned exclusively to one user (i.e., STA) at a time. A given user, however, can be granted simultaneous access to multiple sub-channels at a time. Still further, the particular sub-channel or sub-channels allocated to the user may change over time. It is accordingly critical for efficient and effective use of the medium for the AP to control the assignment of sub-channels to STAs for use in both down-link (DL) and up-link (UL) orthogonal frequency division multiple access (OFDMA) communications.

Each sub-channel may, for example, have a 20 MHz bandwidth, and multiple contiguous 20 MHz bandwidth sub-channels may be allocated to a given user to provide a larger bandwidth communications resource for either down-link or up-link transmissions.

Figure 2:
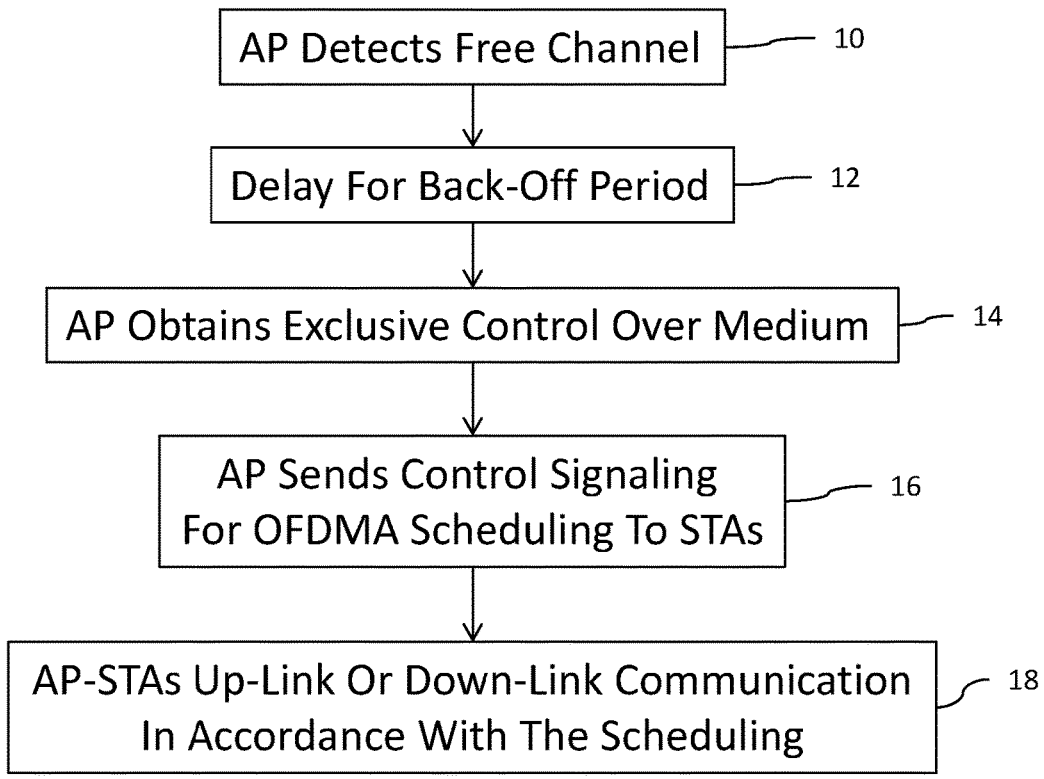
FIG. 2 is a flow diagram illustrating a method for communication.

Reference is now made to FIG. 2 which illustrates a method for communication. In step 10, the AP performs carrier sensing to detect whether a channel is free. As an example, the AP may utilize the well known technique for clear channel assessment (CCA) to detect the free channel. After determining in step 10 that the channel is free, the AP defers its attempt to access the channel during a back-off period (step 12) in order to avoid collisions. The determination of the length of the back-off period is made in accordance with well known techniques (and may, for example, comprise a first fixed time period followed by randomly selected second time period related to the contention window size).

In this implementation, the AP acts as a master device in the network. The AP contends for the medium during a contention period in order to obtain exclusive control of the medium for a certain time period that may include one or more transmission opportunities (TXOP). The TXOP may support either down-link communications (i.e., from the AP to one or more STAs) or up-link communications (i.e, from one or more STAs to the AP). It is important to note that during the time period, only the AP and the STAs capable of OFDMA communications are communicating with each other. All other nodes in the network, such as legacy STAs in 802.11, refrain from communications. The AP and the STAs capable of OFDMA communications will communicate during the time period using a non-contention based multiple access technique with scheduled use (i.e., allocation) of the sub-channels of the medium. The AP controls this scheduling for down-link and up-link communications in a manner discussed below.

The AP uses control signaling to inform the STAs of the resource allocation schedule. This control signaling includes a first component at the level of the physical layer (PHY) of the Open Systems Interconnection model (OSI model) which is well known to those skilled in the art as a conceptual model that characterizes and standardizes the communication functions of a telecommunication or computing system without regard to their underlying internal structure and technology. The control signaling further includes a second component at the level of the media access control layer (MAC) of the OSI model. The control signaling is sent by the AP on all sub-channels to the STAs in step 16 after the back-off period of step 12 expires and the AP has obtained exclusive control of the medium in step 14 for the TXOP made in step 16.

Following that control signaling, each STA is now made aware of the scheduled use of the medium for the TXOP and communication, either down-link or up-link, is made between the AP and the STAs during that TXOP in accordance with the AP defined schedule. So, in step 18, the AP and STAs engage in down-link or up-link OFDMA communications in accordance with the schedule set by the AP and communicated to the STAs in the control signaling. It is important to note that for a given TXOP, one or the other, but not both, of down-link or up-link communications occur. So, the AP may in one instance provide control signaling to schedule down-link OFDMA communications to one or more STAs for a given TXOP, and in another instance provide control signaling to schedule up-link OFDMA communications from one or more STAs for a different TXOP. In this context, the TXOP with respect to each STA for OFDMA communication is of equal time duration, with the TXOP defined by a starting time and that duration. Multiple physical layer protocol data units (PPDU) may be communicated during a single TXOP using an Aggregated MAC Protocol Data Unit (A-MPDU).

Figure 3:
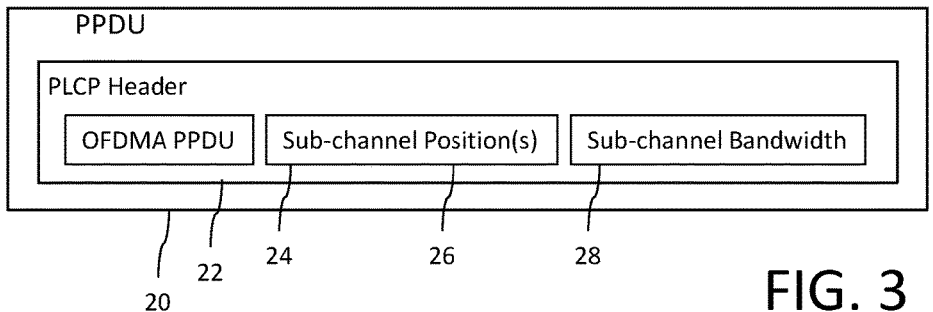
FIG. 3 illustrates a physical layer (PHY) component for OFDMA scheduling.

As discussed above, the control signaling sent in step 16 by the AP includes a first component at the level of the physical layer (PHY) of the OSI model. Those skilled in the art are familiar with the physical layer convergence procedure (PLCP). Reference is made to FIG. 3. The PPDU 20 includes a PLCP header 22. Within the PLCP header 22, the PHY layer of the AP will include a first piece of information 24 to designate that the PPDU is an OFDMA PPDU (i.e., it is a PPDU specific to operation of the medium using OFDMA), a second piece of information 26 to designate the allocated sub-channel position, and a third piece of information 28 to indicate the allocated sub-channel bandwidth.

The STA that receives the PPDU 20 sent by the AP and including the PLCP header 22 with information 24, 26 and 28 will be able to identify from information 24 that the TXOP will use OFDMA communication (for either down-link or up-link as designated elsewhere), identify from information 26 the specific sub-channel that STA has been assigned for OFDMA communications (either down-link or up-link), and identify from information 26 the amount and location of the bandwidth the STA has been assigned for those OFDMA communications.

Figure 4:
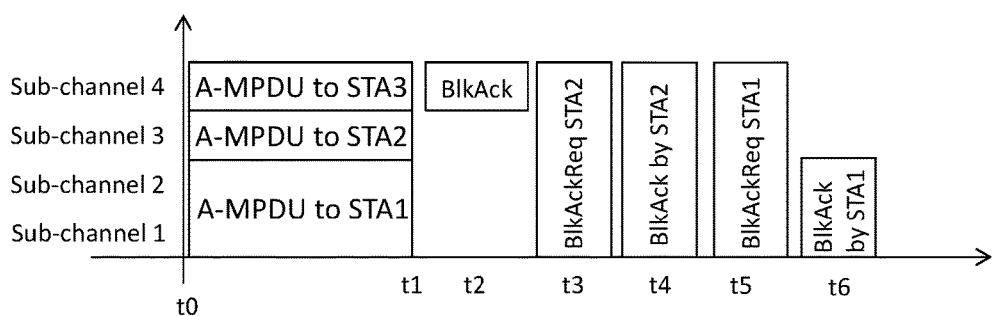
FIG. 4 illustrates a timing example of down-link OFDMA communications scheduled using the component of FIG. 3.

Reference is now made FIG. 4 showing a timing diagram for an example of down-link communications operation. The horizontal axis measures time. The vertical axis is associated with the plurality of sub-channels on the medium. At time t0, the back-off period has expired and the AP has obtained exclusive control of the medium for the time period. The AP desires to engage in down-link OFDMA communications with three different STAs using four sub-channels. The AP has further determined to use two sub-channels (i.e., sub-channel 1 and sub-channel 2) for communication with the first STA (STA1), one sub-channel (i.e., sub-channel 3) for communication with the second STA (STA2) and one sub-channel (i.e., sub-channel 4) for communication with the third STA (STA3) for a given TXOP. The AP generates an A-MPDU to STA1 that occupies the bandwidth of sub-channel 1 and sub-channel 2. The PPDU 20 sent by the AP for A-MPDU to STA1 includes the PLCP header 22 with information 24, 26 and 28. In this context, the information 26 identifies sub-channel 1 and information 28 identifies a bandwidth sufficient to cover two sub-channels (for example, 40 MHz). Since the used sub-channels must be contiguous, the STA will know from information 26 and 28 that the OFDMA communications are allocated for STA1 on sub-channel 1 and sub-channel 2. Similarly, the AP generates an A-MPDU to STA2 that occupies the bandwidth of sub-channel 3. The PPDU 20 sent by the AP for A-MPDU to STA2 includes the PLCP header 22 with information 24, 26 and 28. In this context, the information 26 identifies sub-channel 3 and information 28 identifies a bandwidth sufficient to cover one sub-channel (for example, 20 MHz). The STA will know from information 26 and 28 that the OFDMA communications are allocated for STA2 on sub-channel 3. The AP also generates an A-MPDU to STA3 that occupies the bandwidth of sub-channel 4. The PPDU 20 sent by the AP for A-MPDU to STA3 includes the PLCP header 22 with information 24, 26 and 28. In this context, the information 26 identifies sub-channel 4 and information 28 identifies a bandwidth sufficient to cover one sub-channel (for example, 20 MHz). The STA will know from information 26 and 28 that the OFDMA communications are allocated for STA3 on sub-channel 3. All of the A-MPDUs have a fixed duration that expires at time t1.

After expiration of a short interframe spacing, one of the STAs will reply at time t2 on its allocated sub-channel(s) with a block acknowledgement (BlkAck) of the down-link A-MPDU is received. In this example, it is STA3 with a BlkAck on sub-channel 4. The other STAs do not immediately acknowledge. Instead, those STAs delay acknowledgement waiting for the immediate acknowledgment by STA3 to be completed. The AP may then issue a block acknowledgement request (BlkAckReq) addressed to a specific one of the STAs, see times t3 and t5, in response to which the addressed STA will respond with its block acknowledgement of the frames in the down-link transmitted A-MPDU it received, see times t4 and t6. It will be noted that the AP sends the BlkAckReq using the whole TXOP bandwidth (i.e., on all four sub-channels). This is done to avoid potential collision. The addressed STA has the option to send its BlkAck using all or a portion of the TXOP bandwidth. In this example, the STA2 chose to use all four sub-channels at time t4, and the STA1 chose to use only the two sub-channels it was assigned at time t6.

Since the AP already has obtained exclusive control of the medium for the time period, following time t6 the AP may proceed with another OFDMA communication to the STAs using one or more additional TXOPs until the time period expires. This next communication may, if desired, use the same allocation of sub-channels and bandwidths as before by making no changes to the information 24, 26 and 28 contained within the PLCP header 22. However, the AP may at this point in time change the allocation of sub-channels and bandwidths with respect to the STAs by providing a change in the information 24, 26 and 28 contained within the PLCP header 22. Instead of allocating STA3 two sub-channels (sub-channel 1 and sub-channel 2), the AP may instead allocate only a single sub-channel (for example, sub-channel 1). The second sub-channel 2 previously allocated to STA1 is not wasted in the next TXOP, but rather may be allocated to one of STA2 or STA3, or alternatively allocated to a new STA (STA4). The AP controls the medium and thus can decide with respect to each TXOP the best resource allocation among the served STAs.

In a specific implementation of the information 24, 26 and 28 within the PLCP header 22, the very high throughput (VHT) PLCP signal SIGA and SIGB frames within the PLCP header 22 may be used. This is shown in FIGS. 5A and 5B.

Figure 5C:
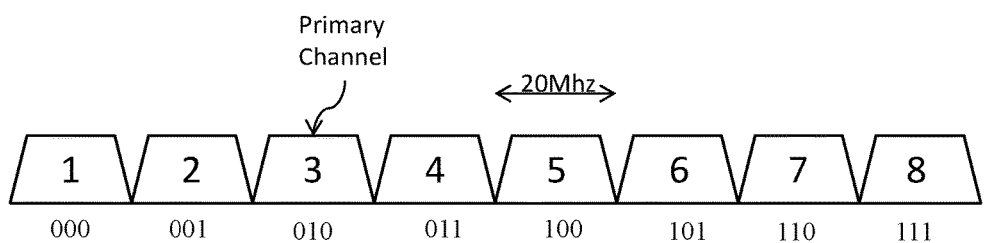
FIG. 5C illustrates identification of sub-channels.

FIG. 5A illustrates the VHT PLCP SIGA frame 30 including a plurality of fields with bit indications. With some exceptions specifically noted below and highlighted in bold, field names generally refer to the well known IEEE 802.11 field names for SIGA and have the same meaning and purpose as known in the art. The information 24 is provided in an OFDMA Indication field 32 which is a single bit field functioning as a flag. If the flag is set (for example, logic 1), this indicates operation using OFDMA communications. If the flag is not set (for example, logic 0), this indicates operation using conventional 802.11 techniques. Note: any STA receiving the communication which is not engaging in OFDMA communications can use the logic 1 flag of field 32 as an indication to discard. The information 26 is provided in a plurality of fields which include a Group ID field 34 and a plurality of OFDMA Sub-channel Position fields 36(1)-36(4). In this implementation, the STAs are managed by the AP for OFDMA communication in groups. For example, each group can include up to four different STAs. Each group is given a group identifier, and each STA in that group is aware of its relative position in the group. The AP will populate the Group ID field 34 with the group identifier, and further populate each of the OFDMA Sub-channel Position fields 36(1)-36(4) with sub-channel position information. The Group ID field 34 includes six bits permitting each AP to manage $2^6$ different groups of STAs. Each OFDMA Sub-channel Position field 36 includes three bits, permitting the AP to assign $2^3$ different sub-channels. FIG. 5C illustrates an example of a mapping of eight 20 MHz sub-channels in the medium to the respective three-bit data for the OFDMA Sub-channel Position field 36. The sub-channels include a primary channel and a plurality of secondary channels.

FIG. 5B illustrates the VHT PLCP SIGB frame 40 including a plurality of fields with bit indications. With some exceptions specifically noted below and highlighted in bold, field names generally refer to the well known IEEE 802.11 field names for SIGB and have the same meaning and purpose as known in the art. A sub-channel bandwidth field 42 is a two bit field used by the AP to specify the sub-channel bandwidth that the STA has been allocated. With two available bits, there can be $2^2$ different sub-channel bandwidth possibilities. Four possible sub-channel bandwidths to be indicated may comprise: 20 MHz, 40 MHz, 80 MHz or 160 MHz. The information 28 is provided by a combination of the OFDMA Sub-channel Position fields 36 and the sub-channel bandwidth field 42. The AP may include a given STA in a group and then assign that STA to one of the OFDMA Sub-channel Position fields 36 (the remaining fields populated with the channel positions of other STA members of the group. The bandwidth identified in sub-channel bandwidth field 42, however, is a specific indication of the allocated bandwidth for the particular STA that is receiving the PLCP header 22. In this regard, it will be noted that the other STA members of the group are receiving their own PLCP headers and the field 42 within the VHT PLCP SIGB frame 40 will include the specific information for their own AP allocated bandwidth.

Reference is once again made to the example of FIG. 4. The three STAs in this example form a group with a certain group identifier that is known to them and the AP. For each PLCP header 22 in a down-link TXOP from the AP, the very high throughput (VHT) PLCP signal SIGA frame is of the type shown in FIG. 5A with the Group ID field 34 is set to a value indicating the group identifier for the group consisting of STA1, STA2 and STA3. The first OFDMA Sub-channel Position field 36(1) is assigned to STA1 and is set to a value indicating the first sub-channel (i.e., sub-channel 1). The second OFDMA Sub-channel Position field 36(2) is assigned to STA2 and set to a value indicating the third sub-channel (i.e., sub-channel 3). The third OFDMA Sub-channel Position field 36(3) is assigned to STA3 and set to a value indicating the fourth sub-channel (i.e., sub-channel 3). The fourth OFDMA Sub-channel Position field 36(4) is not used in this case because the group contains only three STAs. If a fourth STA is a member of the group, the fourth OFDMA Sub-channel Position field 36(4) would be assigned to that STA (i.e., STA4) and set to a value indicating the sub-channel allocated by the AP to that STA.

For each PLCP header 22 in a down-link TXOP from the AP, the very high throughput (VHT) PLCP signal SIGB frame is of the type shown in FIG. 5B. However, the contents of this SIGB frame relating to field 42 are specific to the receiving STA. Thus, the field 42 received by STA1 will, in the example of FIG. 4, include data specifying a bandwidth sufficient for the two sub-channels allocated by the AP to STA1 (i.e., 40 MHz for sub-channel 1 and sub-channel 2 combined). The STA2, on the other hand, will have field 42 of its received SIGB frame populated by data specifying a bandwidth sufficient for its single allocated sub-channel 3 (i.e., 20 MHz). Likewise, the STA3 will field 42 of its received SIGB frame populated by data specifying a bandwidth sufficient for its single allocated sub-channel 4 (i.e., 20 MHz).

Figure 6:
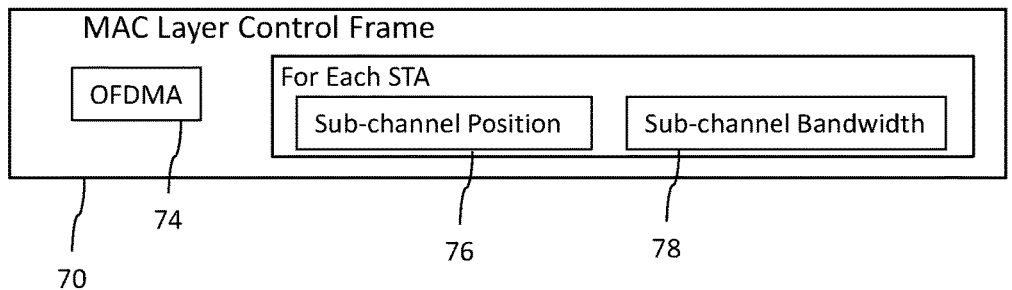
FIG. 6 illustrates a medium access control layer (MAC) component for OFDMA scheduling.

As discussed above, the control signaling sent in step 16 by the AP may include a second component at the level of the media access control layer (MAC) of the OSI model. Reference is now made to FIG. 6. The MAC layer of the AP transmits a MAC layer control frame 70, referred to herein as the OFDMA sub-channel announcement (SCA), that includes a first piece of information 74 to designate that OFDMA communication is being used, a second piece of information 76 for each STA to designate the allocated sub-channel position, and a third piece of information 78 to indicate for that STA the allocated sub-channel bandwidth.

Each STA that receives the MAC layer control frame 70 sent by the AP and including information 74, 76 and 78 will be able to identify from information 74 that the TXOP will use OFDMA communication (for either down-link or up-link as designated elsewhere), identify from information 76 the specific sub-channel that STA has been assigned for OFDMA communications (either down-link or up-link), and identify from information 78 the amount of bandwidth that STA has been assigned for those OFDMA communications.

Figure 7:
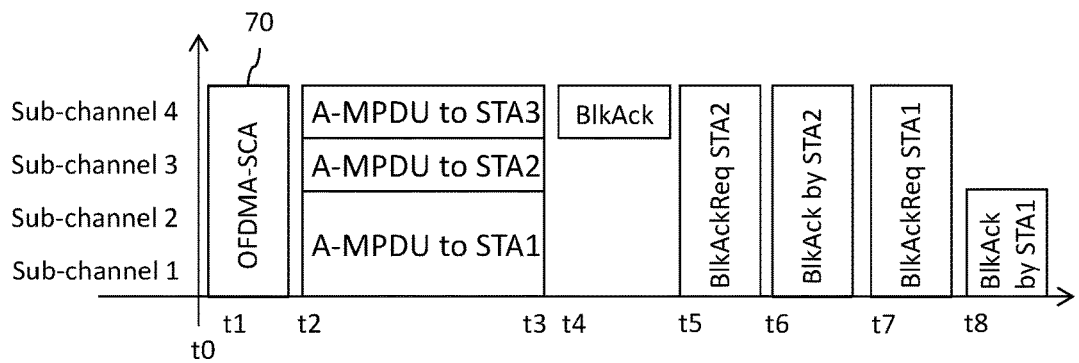
FIGS. 7 and 8 illustrate timing examples of down-link and up-link OFDMA communications scheduled using the component of FIG. 6.

Reference is now made FIG. 7 showing a timing diagram for an example of down-link communications operation. The horizontal axis measures time. The vertical axis is associated with the plurality of sub-channels on the medium. At time t0, the back-off period has expired and the AP has obtained exclusive control of the medium for the time period. The AP desires to engage in down-link OFDMA communications with three different STAs using four sub-channels. The AP has further determined to use two sub-channels (i.e., sub-channel 1 and sub-channel 2) for communication with the first STA (STA1), one sub-channel (i.e., sub-channel 3) for communication with the second STA (STA2) and one sub-channel (i.e., sub-channel 4) for communication with the third STA (STA3) for a given TXOP. At time t1, the AP generates the MAC layer control frame 70 for simultaneous transmission to STA1, STA2 and STA3. In this context, with respect to STA1, the information 76 in the control frame 70 identifies sub-channel 1 and information 78 identifies a bandwidth sufficient to cover two sub-channels (for example, 40 MHz). Since the used sub-channels must be contiguous, the STA will know from information 76 and 78 that the OFDMA communications are allocated for STA1 on sub-channel 1 and sub-channel 2. With respect to STA2, the information 76 in the control frame 70 identifies sub-channel 3 and information 78 identifies a bandwidth sufficient to cover one sub-channel (for example, 20 MHz). Likewise, with respect to STA3, the information 76 in the control frame 70 identifies sub-channel 4 and information 78 identifies a bandwidth sufficient to cover one sub-channel (for example, 20 MHz). The control frame 70 thus provides notice to each of the STAs as to the OFDMA TXOP and the specific allocation of resources on the medium to each STA for communications use.

At time t2, the AP sends an A-MPDU to STA1 that occupies the bandwidth of sub-channel 1 and sub-channel 2, an A-MPDU to STA2 that occupies the bandwidth of sub-channel 3 and an A-MPDU to STA3 that occupies the bandwidth of sub-channel 4. All of the A-MPDUs have a fixed duration that expires at time t3.

After expiration of a short interframe spacing, one of the STAs will reply at time t4 on its allocated sub-channel(s) with a block acknowledgement (BlkAck) of the frame of the received A-MPDU. In this example, it is STA3 with a BlkAck on sub-channel 4. The other STAs do not immediately acknowledge. Instead, those STAs delay acknowledgement waiting for the immediate acknowledgment by STA3 to be completed. The AP may then issue a block acknowledgement request (BlkAckReq) addressed to a specific one of the STAs, see times t5 and t7, in response to which the addressed STA will respond with its block acknowledgement of the frames in the A-MPDU, see times t6 and t8. It will be noted that the AP sends the BlkAckReq using the whole TXOP bandwidth (i.e., on all four sub-channels). This is done to avoid potential collision. The STA has the option to send its BlkAck using all or a portion of the TXOP bandwidth. In this example, the STA2 chose to use all four sub-channels at time t6, and the STA1 chose to use only the two sub-channels it was assigned at time t8.

Since the AP already has obtained exclusive control of the medium for the time period, following time t8 the AP may proceed with transmission of another control frame 70 to the STAs in one or more further TXOPs. This next control frame 70 may, if desired, specify the same allocation of sub-channels and bandwidths as before by making no changes to the information 74, 76 and 78. However, the AP may at this point in time change the allocation of sub-channels and bandwidths with respect to the STAs by providing a change in the information 74, 76 and 78 contained within the control frame 70. Instead of allocating STA3 two sub-channels (sub-channel 1 and sub-channel 2), the AP may instead allocate only a single sub-channel (for example, sub-channel 1). The second sub-channel 2 previously allocated to STA1 is not wasted in the next TXOP, but rather may be allocated to one of STA2 or STA3, or alternatively allocated to a new STA (STA4). The AP controls the medium and thus can decide with respect to each TXOP the best resource allocation among the served STAs.

The AP may also decide following time t8 to change the direction of OFDMA communication. For example, the control frame 70 transmitted at time t1 specifies a down-link OFDMA communication. After time t8, the subsequent control frame 70 may instead specify an up-link OFDMA communication and provide the resource allocation for that up-link communication. The STAs will respond to that subsequent control frame 70 with A-MPDU to the AP transmissions. Details of such up-link communications are discussed below with respect to FIG. 8.

It will be understood that if an STA informs the AP that it is OFDMA compatible, it is mandatory that the STA support down-link OFDMA communication.

Figure 8:
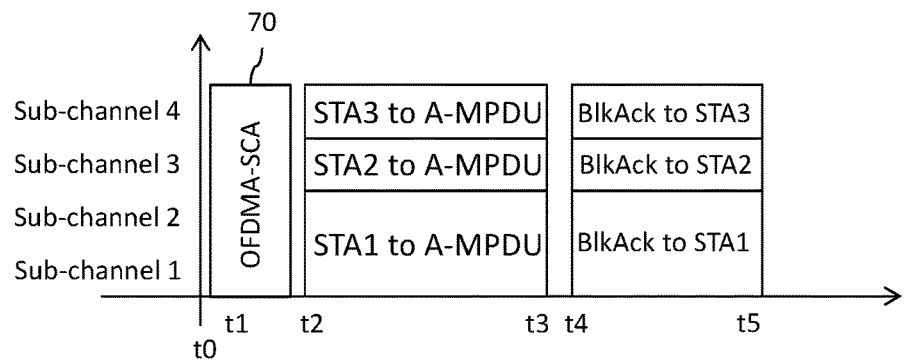

Reference is now made FIG. 8 showing a timing diagram for an example of up-link communications operation. The horizontal axis measures time. The vertical axis is associated with the plurality of sub-channels on the medium. At time t0, the back-off period has expired and the AP has obtained exclusive control of the medium for the time period. The AP desires to engage in down-link OFDMA communications with three different STAs using four sub-channels. The AP has further determined to use two sub-channels (i.e., sub-channel 1 and sub-channel 2) for communication with the first STA (STA1), one sub-channel (i.e., sub-channel 3) for communication with the second STA (STA2) and one sub-channel (i.e., sub-channel 4) for communication with the third STA (STA3) for a given TXOP. At time t1, the AP generates the MAC layer control frame 70 for simultaneous transmission to STA1, STA2 and STA3. In this context, with respect to STA1, the information 76 in the control frame 70 identifies sub-channel 1 and information 78 identifies a bandwidth sufficient to cover two sub-channels (for example, 40 MHz). Since the used sub-channels must be contiguous, the STA will know from information 26 and 28 that the OFDMA communications are allocated for STA1 on sub-channel 1 and sub-channel 2. With respect to STA2, the information 76 in the control frame 70 identifies sub-channel 3 and information 78 identifies a bandwidth sufficient to cover one sub-channel (for example, 20 MHz). Likewise, with respect to STA3, the information 76 in the control frame 70 identifies sub-channel 4 and information 78 identifies a bandwidth sufficient to cover one sub-channel (for example, 20 MHz). The control frame 70 thus provides notice to each of the STAs as to the OFDMA TXOP and the specific allocation of resources on the medium to each STA for communications use.

At time t2, STA1 sends an A-MPDU to the AP that occupies the bandwidth of sub-channel 1 and sub-channel 2, STA2 sends an A-MPDU to the AP that occupies the bandwidth of sub-channel 3 and STA3 sends an A-MPDU to the AP that occupies the bandwidth of sub-channel 4. All of the A-MPDUs have a fixed duration that expires at time t3.

After expiration of a short interframe spacing, the AP simultaneously responds to all of the STAs (STA1, STA2, STA3) at time t4 on the correspondingly allocated sub-channel(s) with a block acknowledgement (BlkAck) of receipt of the frames in the up-link communications. The TXOP ends at time t5.

Since the AP already has obtained exclusive control of the medium for the time period, following time t5 the AP may proceed with transmission of another control frame 70 to the STAs in one or more further TXOPs. This next control frame 70 may, if desired, specify the same allocation of sub-channels and bandwidths as before for up-link communications by making no changes to the information 74, 76 and 78. However, the AP may at this point in time change the allocation of sub-channels and bandwidths with respect to the STAs by providing a change in the information 74, 76 and 78 contained within the control frame 70. Instead of allocating STA3 two sub-channels (sub-channel 1 and sub-channel 2), the AP may instead allocate only a single sub-channel (for example, sub-channel 1). The second sub-channel 2 previously allocated to STA1 is not wasted in the next TXOP, but rather may be allocated to one of STA2 or STA3, or alternatively allocated to a new STA (STA4). The AP controls the medium and thus can decide with respect to each TXOP the best resource allocation among the served STAs.

The AP may also decide following time t5 to change the direction of OFDMA communication. For example, the control frame 70 transmitted at time t1 specifies an up-link OFDMA communication. After time t5, the subsequent control frame 70 may instead specify a down-link OFDMA communication and provide the resource allocation for that down-link communication. The AP will then follow that subsequent control frame 70 with A-MPDU to the STA transmissions. Details of such down-link communications are discussed above with respect to FIG. 7.

FIG. 9A illustrates a specific example of the OFDMA sub-channel announcement (SCA) MAC control frame 70.

The frame 70 includes a plurality of fields. A first field 82 is an FC field. A second field 84 is a duration field including data indicating a duration of the TXOP. A third field 86 is a receiver address (RA) field including a MAC address of a receiver. A fourth field 88 is a transmitter address (TA) field including a MAC address of a transmitter. In this case, this will be the MAC address of the AP. A fifth field 90 a number of receivers field including data indicating a count of the number of STAs that are involved in the OFDMA communication. The control frame 40 further includes a plurality of sixth fields comprising OFDMA Sub-channel fields 92(1)-92(4). Each OFDMA Sub-channel field 92 comprises a plurality of sub-fields including: a sub-channel position field 94, a sub-channel bandwidth field 96 and a receiver associative identity (AID) field 98. The sub-channel position field 94 includes sub-channel position information. Each sub-channel position field 94 may include three bits, permitting the AP to assign $2^3$ different sub-channels. FIG. 5C illustrates an example of a mapping of eight 20 MHz sub-channels in the medium to the respective three-bit data for the sub-channel position field 94. The sub-channels include a primary channel and a plurality of secondary channels. The sub-channel bandwidth field 96 includes sub-channel bandwidth information. Each sub-channel bandwidth field 96 may include two bits, permitting the AP to assign $2^2$ different sub-channel bandwidths. Four possible sub-channel bandwidths to be indicated may comprise: 20 MHz, 40 MHz, 80 MHz or 160 MHz. The control frame 70 still further includes a seventh field comprising a FCS field 100.

The transmission of the control frame 70 itself provides the first piece of information 74 to designate that OFDMA communication is being used. Each STA receiving the control frame 70 processes the data therein and acts in response to the AP allocation of medium resources. The data in the number of receivers field 90 tells the receiving STAs how many of the following OFDMA Sub-channel fields 92(1)-92(4) have been populated with valid data. The STAs accordingly know which ones of the OFDMA Sub-channel fields 92(1)-92(4) need to be evaluated. The STAs determine whether the receiver associative identity (AID) field 98 contains information matching the identity of the STA. If there is a match, the STA uses the data contained in the associated sub-channel position field 94 and sub-channel bandwidth field 96 to identify the sub-channel and bandwidth that has been allocated by the AP to that particular STA. The fields 94 and 96 accordingly provide, respectively, the second piece of information 76 for each STA to designate the allocated sub-channel position and the third piece of information 78 to indicate for that STA the allocated sub-channel bandwidth. The first OFDMA Sub-channel field 92(1) may be considered mandatory, with the remaining OFDMA Sub-channel fields 92(2)-92(4) as optional depending on the AP's allocation of resources for OFDMA communications.

Figure 9B:
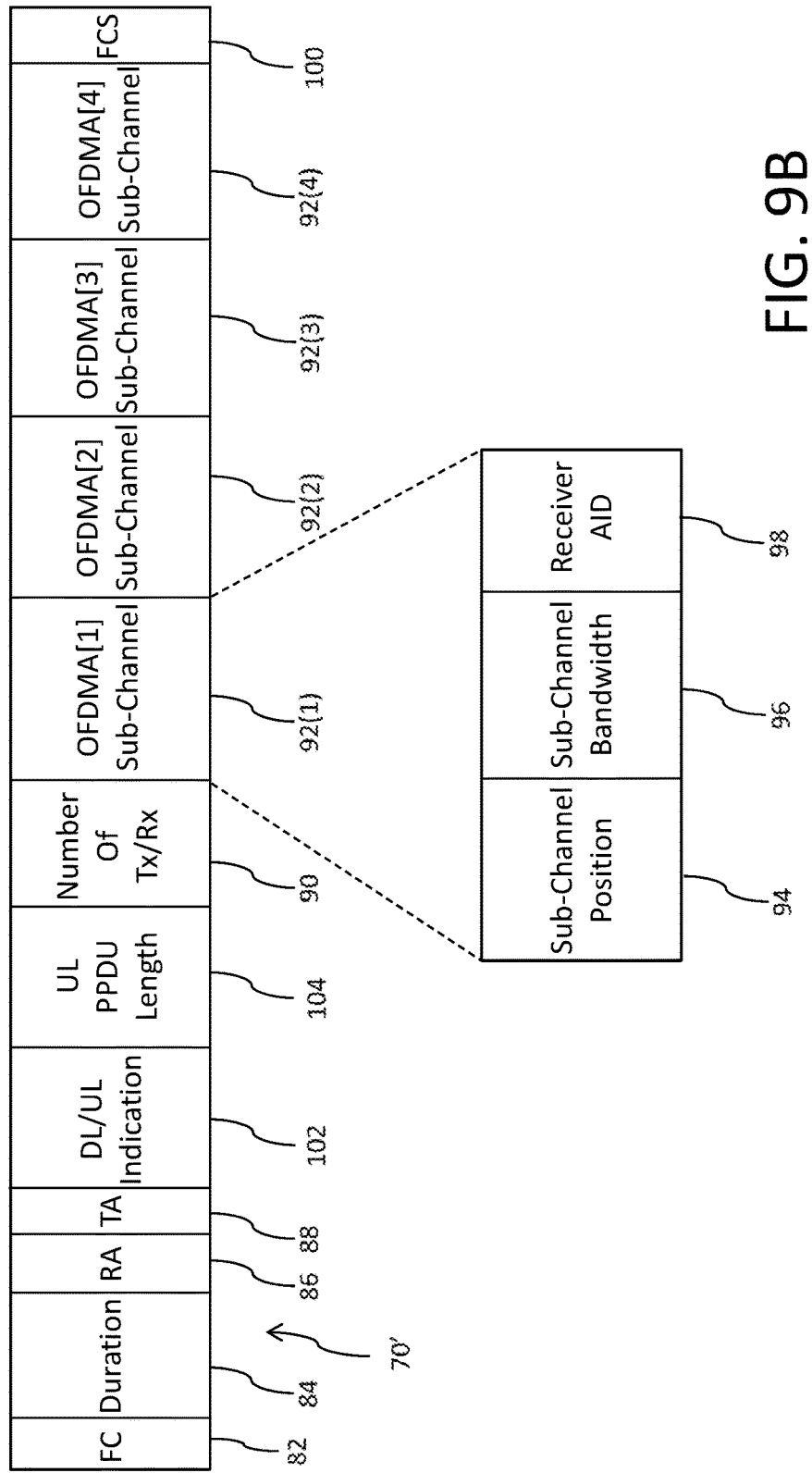

FIG. 9B illustrates another specific example of the OFDMA sub-channel announcement (SCA) MAC control frame 70'. The frame 70' includes a plurality of fields identical to the frame 70 of FIG. 9A. For purposes of brevity, those common fields will not be described herein, and reference is made to the foregoing discussion of FIG. 8. The frame 70' includes some additional fields. An eighth field 102 is an up-link/down-link indication field that indicates whether the AP is organizing through this control frame 70' an up-link OFDMA communication (STA to AP) or down-link OFDMA communication (AP to STA). A ninth field 104 is an up-link PPDU length field that includes data specifying the length of the PPDU that each STA may transmit in their up-link OFDMA communication. The fifth field 90 in frame 70' is a number of transmitters/receivers field including data indicating a count of the number of STAs that are involved in the OFDMA communication. Reference is made here to transmitters/receivers because the STAs are functioning as OFDMA transmit entities for up-link communications and are functioning as OFDMA receive entities for down-link communications.

While the invention has been illustrated and described in detail in the drawings and foregoing description, such illustration and description are considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

What is claimed is:

1. A method for orthogonal frequency division multiple access (OFDMA) communication in a wireless local area network (WLAN) including an access point (AP) and a plurality of client stations (STAs), comprising:
   obtaining by the AP of exclusive control of a wireless communications medium including a plurality of sub-channels for a time period;
   determining by the AP of an allocation of one or more sub-channels to certain STAs of the plurality of STAs for use in said time period for OFDMA communications; and
   sending by the AP at a beginning of the time period on each of the plurality of sub-channels of a control frame including for each STA of said certain STAs: a) an identification of the STA; b) an identification of one or more sub-channels allocated to the STA; and c) an identification of a bandwidth to use for communications with the STA;
   sending by the AP of simultaneous Aggregated MAC Protocol Data Unit (A-MPDU) communications using OFDMA to the certain STAs;
   wherein each A-MPDU communication includes a physical layer protocol data unit (PPDU) including a physical layer convergence procedure (PLCP) header comprising:
      a first signaling information field including a flag specifying whether the PPDU included in the A-MPDU communication is an OFDMA communication;
      a second signaling information field specifying one or more sub-channels allocated to an STA of said certain STAs;
      a third signaling information field specifying a bandwidth allocated to that STA of said certain STAs on the one or more sub-channels allocated to that STA of said certain STAs;
      a fourth signaling information field specifying other STAs assigned to belong in a group with that STA of said certain STAs for OFDMA communications; and
      a fifth signaling information field specifying one or more sub-channels allocated to said other STAs in said group.

2. The method of claim 1, wherein said control frame specifies whether the OFDMA communications with the certain STAs during said time period are to be down-link communications from the AP to the certain STAs.

3. The method of claim 2, said simultaneous A-MPDU communications having a same start time and same finish time within said time period.

4. The method of claim 3, further comprising issuing, after said finish time, a block acknowledgement of received A-MPDU communications from the AP.

5. The method of claim 4, wherein the block acknowledgement is made in response to receipt of a block acknowledgement request transmitted by the AP.

6. The method of claim 5, further comprising transmitting the block acknowledgement request by the AP on all sub-channels used for the simultaneous A-MPDU communications.

7. The method of claim 6, wherein the block acknowledgement is transmitted on all sub-channels used for the simultaneous A-MPDU communications.

8. The method of claim 1, wherein the control frame is a medium access layer (MAC) control frame.

9. A method for orthogonal frequency division multiple access (OFDMA) communication in a wireless local area network (WLAN) including an access point (AP) and a plurality of client stations (STAs), comprising:
   obtaining by the AP of exclusive control of a wireless communications medium including a plurality of sub-channels for a time period;
   determining by the AP of an allocation of one or more sub-channels to certain STAs of the plurality of STAs for use in said time period for OFDMA communications; and
   sending by the AP of simultaneous Aggregated MAC Protocol Data Unit (A-MPDU) communications using OFDMA to the certain STAs, said simultaneous A-MPDU communications having a same start time and same finish time within said time period;
   wherein each A-MPDU communication includes a physical layer protocol data unit (PPDU) including a physical layer convergence procedure (PLCP) header comprising:
      a first signaling information field including a flag specifying whether the PPDU of the A-MPDU communication is an OFDMA communication;
      a second signaling information field specifying one or more sub-channels allocated to an STA of said certain STAs;
      a third signaling information field specifying a bandwidth allocated to that STA of said certain STAs on the one or more sub-channels allocated to that STA of said certain STAs;
      a fourth signaling information field specifying other STAs assigned to belong in a group with that STA of said certain STAs for OFDMA communications; and
      a fifth signaling information field specifying one or more sub-channels allocated to said other STAs in said group.

10. The method of claim 9, further comprising issuing, after said finish time, of a block acknowledgement of received A-MPDU communications from the AP.

11. The method of claim 10, wherein the block acknowledgement is made in response to receipt of a block acknowledgement request transmitted by the AP.

12. The method of claim 11, further comprising transmitting the block acknowledgement request by the AP on all sub-channels used for the simultaneous A-MPDU communications.

13. The method of claim 12, wherein the block acknowledgement is transmitted on all sub-channels used for the simultaneous A-MPDU communications.

\* \* \* \* \*